G. STAPLES.
TIRE CHAIN HOLDER.
APPLICATION FILED FEB. 28, 1919.
1,420,777.
Patented June 27, 1922.
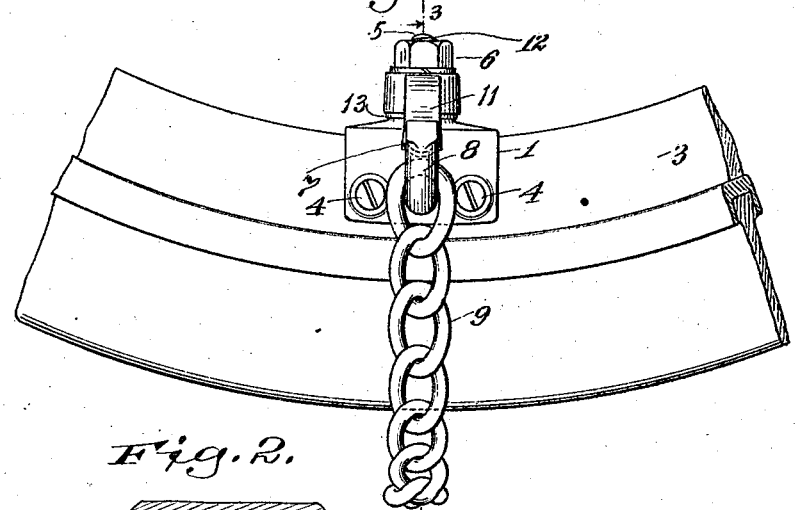
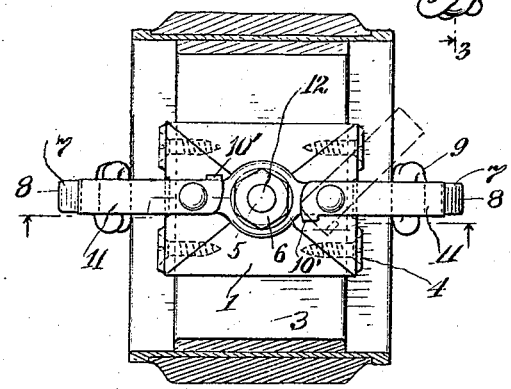
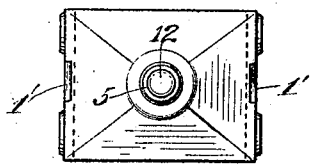
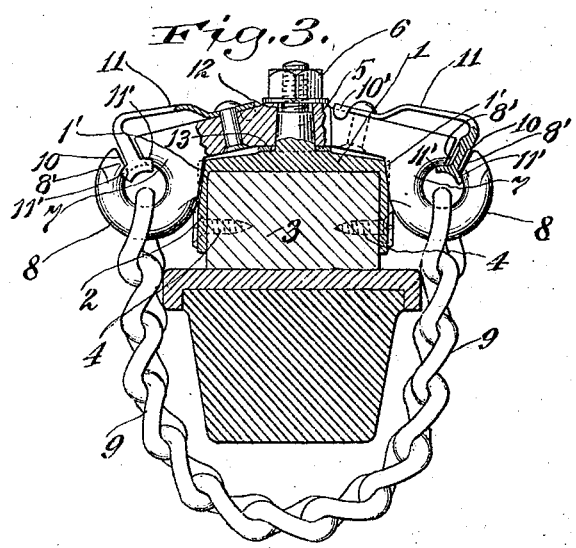
Inventor
George Staples.
By Morsell + Keeney
Attorneys.

UNITED STATES PATENT OFFICE.

GEORGE STAPLES, OF OSHKOSH, WISCONSIN, ASSIGNOR TO STAPLES AND SEEFELD, OF MILWAUKEE, WISCONSIN, A MILWAUKEE PARTNERSHIP.

TIRE-CHAIN HOLDER.

1,420,777.        Specification of Letters Patent.    Patented June 27, 1922.

Application filed February 28, 1919. Serial No. 279,857.

*To all whom it may concern:*

Be it known that I, GEORGE STAPLES, a citizen of the United States, and resident of Oshkosh, in the county of Winnebago and State of Wisconsin, have invented new and useful Improvements in Tire-Chain Holders, of which the following is a description, reference being had to the accompanying drawings, which are a part of this specification.

My invention consists of an anti-skid device, and has for its object a simple and quick detachable mechanism, eliminating the circumferential chain, and complicated fastening devices.

A further object of the invention is to provide an anti-skid device which may be easily attached to a wheel of the motor driven type and which will prevent skidding or lateral sliding.

A further object of the invention is to provide an anti-skid device easily attached to a wheel in which the chain member may be quickly detached from the holding portions, when desired, without the use of tools.

A further object of the invention is to provide an anti-skid device in which the chain ends are connected and locked to the holding member in a manner to permit easy removal, but which will prevent accidental disengagement.

The above and additional objects are accomplished by such means as are illustrated in the accompanying drawing, described in the following specification, and more particularly pointed out in the claims which are appended hereto and form a part of this application.

With reference to the drawing wherein I have illustrated the preferred embodiment of my invention as it is reduced to practice and throughout the several views of which like characters of reference designate similar parts:

Fig. 1 is a side view of a portion of a wheel with the improved anti-skid device mounted thereon;

Fig. 2 is a fragmentary view of the inner periphery of the felly of the wheel with the device mounted thereon;

Fig. 3 is a transverse sectional view on line 3—3 of Fig. 1, parts being shown in full lines;

Fig. 4 is a top view of the holding plate member; and

Fig. 5 is a sectional detail view of one of the locking members.

My anti-skidding device is composed of a series of transversely fastened chains extending around the outer periphery of a tire and all its components engaging the felly of a wheel, and is composed of a holding member 1 of suitable strong material with opposite flange 2 forming an integral part of said holding member 1 and rigidly embracing the outer face portions of the felly 3 and secured thereto by means of the fastening screws 4—4. The inner neck-formed portion of the holding member 1 has a post 5 provided with a screw-threaded terminal 12 adapted to be engaged by a compression nut 6. A hook member 7 is centrally and removably mounted upon the holding member 1, having a circumferential engagement with the tapered post portion 5 of the holding member 1, and is held in position by a nut 6, threaded on the terminal portion 12. The hook member 7 is of a slightly angular construction, and has formed at its outer terminals hook or open eye-shaped portions 8, the openings or slots 10 of which receive the end links of the chain 9. The opposite side portions of the holding member 1 are formed with vertically extending recesses 1' to receive the inner side edge portions of the hook member 7 to prevent turning or twisting of said hook member on the bolt 5.

The flexible locking members 11 pivotally fastened at their inner ends to the inclined portions of the hook holder 7 have their outer ends resiliently pressed into the open portions of the hook 10 and form the locking closure therefor. The outer end portions of the flexible locking members 11 extend at right angles to enter the open portions 10 of the hook parts and at their outer ends are provided with inwardly and outwardly extending semi-circular flanges 11' which partly surround the end portions 8' forming the hook portions of the hook member and lock the slot openings. In order to swing the locking members to unlocking positions it is only necessary to press the locking members downwardly towards the hook eyes so that the semicircular flanges will clear the hook ends and then swing the locking members to one side of the hook members to open the slots. The locking members are also formed with stop projections 10' which engage one side portion of the hook member to prevent turning the locking member except in one direction.

A washer 13 is mounted on the post 5 and interposed between the holding member and the hook member which may be removed when the parts wear to provide a tight fit between the hook member and the post.

One of the end links of the chain 9 is engaged by one of the hook portions and the chain is then placed around the outer periphery of the wheel tire and loosely engages the same, and then its opposite end link is inserted into the opposite eyed portion of the hook member, and by means of the closure device 7 is locked in position.

All of the parts of the device, with the exception of the chain, when not in operation can remain in rigid engagement with the felly of the wheel, thus permitting the chain to be quickly secured in operative position when needed, thereby saving time and labor.

The details of the parts of the device may be changed or modified within the scope of the claims without departing from the spirit of the invention.

What I claim as my invention is:

1. A tire chain, comprising a holding member having means for attachment to a wheel, a post rigidly fastened to said means a hook member removably mounted on the post, a chain having one of its ends connected to the hook member and its opposite end removably engaged by the hook member, and means for closing the hook opening to prevent accidental disengagement of the chain.

2. A tire chain, comprising a holding member having means for fastening to a wheel, a post rigidly fastened to said means a hook member removably mounted on the post, said hook member having slotted hooks formed at each of its end portions, a locking means for the slots of the hook portions, and a chain having its opposite ends connected to the hook member.

3. A tire chain, comprising a holding member having means for fastening its end portions to a wheel, a hook member connected to the holding member and having oppositely extending arms with slotted hooks formed at each end, resilient locking means for the hooks, each locking means being pivotally mounted on the hook member and having an end portion which by pressing down on same may be inserted in one of the slots of the hook portion and when released from pressure after such insertion is securely held in locking position by its resiliency and a chain having its opposite ends connected to the hook portions of the hook member.

4. A tire chain, comprising a holding member adapted to engage the opposite side portions of a wheel, a hook member removably mounted on the holding member and extending transversely thereof and having hook shaped opposite end portions with the openings to the hooks extending upwardly, resilient locking members pivotally mounted on the hook members and having outer end portions which lockingly enter the hook portions, and a flexible member having its opposite end portions removably connected to the hook portions.

5. A tire chain, comprising a holding member adapted to engage the opposite side portions of a wheel, a hook member mounted on the holding member and extending transversely thereof and having hook shaped opposite end portions with the openings to the hooks extending upwardly, resilient locking members pivotally mounted on the hook members and having outer end portions provided with projecting flanges which lockingly engage parts of the hook portions and form a closure for the hook openings, a stop on the inner end portions of said locking member which prevents turning of the locking members past the point of locking engagement with the hook members, and a flexible member having its opposite end portions removably connected to the hook portions.

In testimony whereof, I affix my signature.

GEORGE STAPLES.